(12) United States Patent
Konagai

(10) Patent No.: US 10,988,072 B2
(45) Date of Patent: Apr. 27, 2021

(54) LASHING HOOK, LASHING DEVICE, AND LASHING METHOD

(71) Applicant: AVIELAN Corporation, Owariasahi (JP)

(72) Inventor: Takeshi Konagai, Nagoya (JP)

(73) Assignee: AVIELAN CORPORATION, Owariasahi (JP)

( * ) Notice: Subject to any disclaimer, the term of this patent is extended or adjusted under 35 U.S.C. 154(b) by 0 days.

(21) Appl. No.: 16/491,347

(22) PCT Filed: Mar. 29, 2017

(86) PCT No.: PCT/JP2017/012979
§ 371 (c)(1),
(2) Date: Sep. 5, 2019

(87) PCT Pub. No.: WO2018/179159
PCT Pub. Date: Oct. 4, 2018

(65) Prior Publication Data
US 2020/0023767 A1 Jan. 23, 2020

(51) Int. Cl.
*B60P 7/08* (2006.01)
(52) U.S. Cl.
CPC ............. *B60P 7/0823* (2013.01); *B60P 7/083* (2013.01)
(58) Field of Classification Search
CPC ..... B60P 7/0823; B60P 7/0876; B60P 7/0853; B60P 7/135; B60P 7/0807; B60P 7/083; B60P 7/12; B60P 7/04; B60P 7/06
USPC ... 410/98, 97, 100, 34, 99, 118, 155, 68, 49, 410/43; 248/309.1, 499, 500, 680, 125.3, 248/471
See application file for complete search history.

(56) References Cited

U.S. PATENT DOCUMENTS

| | | | |
|---|---|---|---|
| 1,427,736 | A | 8/1922 | Hendricks |
| 4,102,018 | A | 7/1978 | Kawahara |
| | | (Continued) | |

FOREIGN PATENT DOCUMENTS

| | | |
|---|---|---|
| AU | 29 042/67 | 4/1970 |
| CN | 200984068 Y | 12/2007 |
| | (Continued) | |

OTHER PUBLICATIONS

International Search Report for corresponding International Patent Application No. PCT/JP2017/012979, dated Jun. 20, 2017 with full English translation.

(Continued)

*Primary Examiner* — D Glenn Dayoan
*Assistant Examiner* — Sunsurraye Westbrook
(74) *Attorney, Agent, or Firm* — Myers Wolin, LLC.

(57) ABSTRACT

The lashing hook includes a hook portion hooked to a fixing member of a lashing target, and a body portion. The body portion includes a connecting portion for connecting a belt for transmitting tension. The hook portion includes a base portion, a curved portion, and a tip portion. The curved portion has an opening between the base portion and the tip portion while having a space for accommodating the fixing member inside the opening. When the direction in which the body portion and the vicinity of the base portion have their thickness is the Z direction, the curved portion has a bend in the Z direction so as not to overlap the Z directional position of the tip portion and the Z directional position of the base portion.

9 Claims, 7 Drawing Sheets

(56) References Cited

U.S. PATENT DOCUMENTS

| | | | | |
|---|---|---|---|---|
| 4,422,218 | A | * 12/1983 | Brasseux | B60P 7/0838 |
| | | | | 24/270 |
| D397,287 | S | 8/1998 | Hergott et al. | |
| 7,065,840 | B2 | * 6/2006 | Profit | B25B 25/00 |
| | | | | 24/68 CD |
| 9,163,440 | B2 | * 10/2015 | Hagan | B25B 5/08 |
| 2012/0155983 | A1 | * 6/2012 | La Londe | B60R 9/04 |
| | | | | 410/98 |

FOREIGN PATENT DOCUMENTS

| | | | |
|---|---|---|---|
| CN | 104908636 | A | 9/2015 |
| DE | 296 14 300 | U1 | 10/1996 |
| FR | 2 753 243 | A1 | 3/1998 |
| JP | 2002031193 | A | 1/2002 |
| JP | 2002031194 | A | 1/2002 |

OTHER PUBLICATIONS

Extended European search report with supplementary European search report and the European search opinion ssued by the European Patent Office for corresponding European Patent Application No. 17902841.0—1015, dated Oct. 14, 2020.

First Office Action issued by the State Intellectual Property Office of People's Republic of China for corresponding Chinese Patent Application No. 201780088905.0, dated Oct. 16, 2020, with an English translation.

* cited by examiner

Fig. 6

| Test No. | Comparison Example | | First Embodiment | |
|---|---|---|---|---|
| | Drop-Off or Not | Moving Distance (mm) | Drop-Off or Not | Moving Distance (mm) |
| 1 | Drop-Off | 20 | Not Drop-Off | 300 |
| 2 | Drop-Off | 18 | Not Drop-Off | 300 |
| 3 | Drop-Off | 22 | Not Drop-Off | 300 |
| 4 | Drop-Off | 16 | Not Drop-Off | 300 |
| 5 | Drop-Off | 21 | Not Drop-Off | 300 |
| 6 | Drop-Off | 24 | Not Drop-Off | 300 |
| 7 | Drop-Off | 20 | Not Drop-Off | 300 |
| 8 | Drop-Off | 19 | Not Drop-Off | 300 |
| 9 | Drop-Off | 18 | Not Drop-Off | 300 |
| 10 | Drop-Off | 23 | Not Drop-Off | 300 |
| 11 | Drop-Off | 16 | Not Drop-Off | 300 |
| 12 | Drop-Off | 18 | Not Drop-Off | 300 |
| 13 | Drop-Off | 14 | Not Drop-Off | 300 |
| 14 | Drop-Off | 20 | Not Drop-Off | 300 |
| 15 | Drop-Off | 16 | Not Drop-Off | 300 |
| 16 | Drop-Off | 20 | Not Drop-Off | 300 |
| 17 | Drop-Off | 21 | Not Drop-Off | 300 |
| 18 | Drop-Off | 18 | Not Drop-Off | 300 |
| 19 | Drop-Off | 20 | Not Drop-Off | 300 |
| 20 | Drop-Off | 16 | Not Drop-Off | 300 |
| 21 | Drop-Off | 18 | Not Drop-Off | 300 |
| 22 | Drop-Off | 20 | Not Drop-Off | 300 |
| 23 | Drop-Off | 21 | Not Drop-Off | 300 |
| 24 | Drop-Off | 18 | Not Drop-Off | 300 |
| 25 | Drop-Off | 21 | Not Drop-Off | 300 |
| 26 | Drop-Off | 23 | Not Drop-Off | 300 |
| 27 | Drop-Off | 18 | Not Drop-Off | 300 |
| 28 | Drop-Off | 21 | Not Drop-Off | 300 |
| 29 | Drop-Off | 17 | Not Drop-Off | 300 |
| 30 | Drop-Off | 21 | Not Drop-Off | 300 |
| | | | | |
| Number of Times of Drop-off | 30 | | 0 | |
| Mean Moving Distance | | 19.3 | | 300 |

Fig. 7

| Test No. | Comparison Example | | First Embodiment | |
|---|---|---|---|---|
| | Drop-Off or Not | Moving Distance (mm) | Drop-Off or Not | Moving Distance (mm) |
| 1 | Drop-Off | 31 | Not Drop-Off | 300 |
| 2 | Drop-Off | 23 | Not Drop-Off | 300 |
| 3 | Drop-Off | 28 | Not Drop-Off | 300 |
| 4 | Drop-Off | 27 | Not Drop-Off | 300 |
| 5 | Drop-Off | 28 | Not Drop-Off | 300 |
| 6 | Drop-Off | 25 | Not Drop-Off | 300 |
| 7 | Drop-Off | 32 | Not Drop-Off | 300 |
| 8 | Drop-Off | 27 | Not Drop-Off | 300 |
| 9 | Drop-Off | 23 | Not Drop-Off | 300 |
| 10 | Drop-Off | 24 | Not Drop-Off | 300 |
| 11 | Drop-Off | 27 | Not Drop-Off | 300 |
| 12 | Drop-Off | 23 | Not Drop-Off | 300 |
| 13 | Drop-Off | 28 | Not Drop-Off | 300 |
| 14 | Drop-Off | 30 | Not Drop-Off | 300 |
| 15 | Drop-Off | 24 | Not Drop-Off | 300 |
| 16 | Drop-Off | 33 | Not Drop-Off | 300 |
| 17 | Drop-Off | 28 | Not Drop-Off | 300 |
| 18 | Drop-Off | 23 | Not Drop-Off | 300 |
| 19 | Drop-Off | 28 | Not Drop-Off | 300 |
| 20 | Drop-Off | 28 | Not Drop-Off | 300 |
| 21 | Drop-Off | 27 | Not Drop-Off | 300 |
| 22 | Drop-Off | 25 | Not Drop-Off | 300 |
| 23 | Drop-Off | 31 | Not Drop-Off | 300 |
| 24 | Drop-Off | 23 | Not Drop-Off | 300 |
| 25 | Drop-Off | 30 | Not Drop-Off | 300 |
| 26 | Drop-Off | 26 | Not Drop-Off | 300 |
| 27 | Drop-Off | 21 | Not Drop-Off | 300 |
| 28 | Drop-Off | 29 | Not Drop-Off | 300 |
| 29 | Drop-Off | 27 | Not Drop-Off | 300 |
| 30 | Drop-Off | 28 | Not Drop-Off | 300 |
| | | | | |
| Number of Times of Drop-off | 30 | | 0 | |
| Mean Moving Distance | | 26.9 | | 300 |

Fig. 8

| Test No. | Existing Hook | | New Hook | |
|---|---|---|---|---|
| | Drop-Off or Not | Elevation Angle (degrees) | Drop-Off or Not | Elevation Angle (degrees) |
| 1 | Drop-Off | 23 | Drop-Off | 62 |
| 2 | Drop-Off | 25 | Drop-Off | 67 |
| 3 | Drop-Off | 24 | Drop-Off | 63 |
| 4 | Drop-Off | 27 | Drop-Off | 59 |
| 5 | Drop-Off | 28 | Drop-Off | 60 |
| 6 | Drop-Off | 23 | Drop-Off | 58 |
| 7 | Drop-Off | 22 | Drop-Off | 54 |
| 8 | Drop-Off | 25 | Drop-Off | 63 |
| 9 | Drop-Off | 27 | Drop-Off | 62 |
| 10 | Drop-Off | 20 | Drop-Off | 60 |
| 11 | Drop-Off | 24 | Drop-Off | 60 |
| 12 | Drop-Off | 24 | Drop-Off | 58 |
| 13 | Drop-Off | 23 | Drop-Off | 64 |
| 14 | Drop-Off | 26 | Drop-Off | 70 |
| 15 | Drop-Off | 25 | Drop-Off | 63 |
| 16 | Drop-Off | 22 | Drop-Off | 56 |
| 17 | Drop-Off | 31 | Drop-Off | 63 |
| 18 | Drop-Off | 24 | Drop-Off | 60 |
| 19 | Drop-Off | 21 | Drop-Off | 62 |
| 20 | Drop-Off | 25 | Drop-Off | 58 |
| 21 | Drop-Off | 27 | Drop-Off | 54 |
| 22 | Drop-Off | 23 | Drop-Off | 66 |
| 23 | Drop-Off | 26 | Drop-Off | 60 |
| 24 | Drop-Off | 26 | Drop-Off | 59 |
| 25 | Drop-Off | 21 | Drop-Off | 65 |
| 26 | Drop-Off | 27 | Drop-Off | 58 |
| 27 | Drop-Off | 23 | Drop-Off | 60 |
| 28 | Drop-Off | 24 | Drop-Off | 56 |
| 29 | Drop-Off | 27 | Drop-Off | 68 |
| 30 | Drop-Off | 23 | Drop-Off | 64 |
| | | | | |
| Number of Times of Drop-off | 30 | | 30 | |
| Mean Elevation Angle | | 24.5 | | 61.1 |

Fig. 9

| Test No. | Lashing Hook 45° | | Lashing Hook 55° | |
|---|---|---|---|---|
| | Drop-Off or Not | Moving Distance (mm) | Drop-Off or Not | Moving Distance (mm) |
| 1 | Not Drop-Off | 300 | Drop-Off | 41 |
| 2 | Not Drop-Off | 300 | Not Drop-Off | 300 |
| 3 | Not Drop-Off | 300 | Not Drop-Off | 300 |
| 4 | Not Drop-Off | 300 | Drop-Off | 43 |
| 5 | Not Drop-Off | 300 | Drop-Off | 52 |
| 6 | Not Drop-Off | 300 | Drop-Off | 47 |
| 7 | Drop-Off | 48 | Not Drop-Off | 300 |
| 8 | Not Drop-Off | 300 | Not Drop-Off | 300 |
| 9 | Not Drop-Off | 300 | Drop-Off | 55 |
| 10 | Drop-Off | 60 | Not Drop-Off | 300 |
| 11 | Drop-Off | 57 | Drop-Off | 44 |
| 12 | Not Drop-Off | 300 | Drop-Off | 48 |
| 13 | Not Drop-Off | 300 | Drop-Off | 40 |
| 14 | Drop-Off | 51 | Not Drop-Off | 300 |
| 15 | Not Drop-Off | 300 | Drop-Off | 48 |
| 16 | Not Drop-Off | 300 | Not Drop-Off | 300 |
| 17 | Not Drop-Off | 300 | Not Drop-Off | 300 |
| 18 | Not Drop-Off | 300 | Drop-Off | 53 |
| 19 | Not Drop-Off | 300 | Drop-Off | 48 |
| 20 | Not Drop-Off | 300 | Not Drop-Off | 300 |
| | | | | |
| Number of Times of Drop-off | 4 | | 11 | |
| Mean Moving Distance | | 250.8 | | 161 |

LASHING HOOK, LASHING DEVICE, AND LASHING METHOD

CROSS-REFERENCE TO RELATED APPLICATION

This application is a continuation of International Patent Application No. PCT/JP2017/012979, filed on Mar. 29, 2017, the entire contents of which is herein incorporated by reference.

TECHNICAL FIELD

The present invention relates to a lashing hook, a lashing device, and a lashing method, and more particularly, to a lashing hook suitable for preventing positional deviation of a lashing target, and a lashing device and a lashing method using the hook.

BACKGROUND ART

When cargo such as automobiles is transported on a ship, it is necessary to fix the cargo on the deck in order to prevent positional deviation during a voyage. Recent automobiles are equipped with a fixing member such as an eye-bolt in order to facilitate fixing thereof. The eye-bolt includes an annular loop portion for latching a hook, and a bolt portion to be fixed with an automobile or the like.

Patent Document 1 discloses a lashing device for fixing a lashing target such as an automobile on a ship or the like. The lashing device includes a lashing hook for latching onto a fixing member such as an eye-bolt. One end of a rope or a belt is fixed to the lashing hook. The other end of the belt is connected to a fixing hook via a tension generating mechanism. The fixing hook is fastened to an immovable member provided on a deck of a ship or the like.

The tension generating mechanism incorporates an operating lever utilizing the principle of leverage. The operating lever is reversed from the released position to the fixed position with the fulcrum as a center, thereby tensioning the belt connecting the lashing hook and the fixing hook. Therefore, according to the lashing device described in Patent Document 1, tension of the belt can be applied to the lashing target when the operation lever of the tension generating mechanism is reversed after the lashing hook is latched to the lashing target and the fixing hook is latched to the immovable member. By applying the same tension to a plurality of points, for example, four corners of an automobile, the position of the lashing target can be fixed.

PRIOR-ART DOCUMENT PATENT DOCUMENT

The applicant has known the following documents as prior art documents related to the invention included in the present application, including Patent Document 1 discussed above.

[Patent Document 1]
JP-A-2002-31193
[Patent Document 2]
JP-A-2002-31194

DISCLOSURE OF THE INVENTION

Problems to be Solved by the Invention

In the course of transportation by a ship or the like, forces in various directions act on a lashing target such as an automobile or the like. For example, when the ship tilts to the left, a force directed to the left acts on the lashing target. At this time, the strap latched on the right side is expanded, while the strap latched on the left side is contracted. The left strap may then become loose.

The lashing hook is never allowed to detach from an eye-bolt or the like even when such loosening occurs. When the lashing hook is hooked from below to the loop portion which is arranged horizontally, the open part of the hook tends to face upward. If the strap is loosened in such a state, the lashing hook may drop off from the loop portion due to its own weight.

On the other hand, when the lashing hook is hooked from above to the horizontally arranged loop portion, the open portion of the hook tends to face downward. In this case, since the weight of the hook acts in the direction of maintaining the hook latching, even if looseness occurs in the strap, the hook does not easily drop off from the loop portion.

In view of such circumstances, the lashing device described in Patent Document 1 is premised on the use according to the following two points:

(1) a fixing member for latching a hook, such as a loop portion of an eye-bolt, is disposed horizontally; and
(2) a lashing hook is fastened to the fixing member from the upper side.

Various restrictions are imposed on a fixing member provided to a lashing target such as an automobile. For example, eye-bolts of automobiles are usually placed under the floor of the vehicle body due to design constraints and the like. The operation of fastening the lashing hook to such a fixing member from the upper side is not necessarily easy. Therefore, the lashing device described in Patent Document 1 can provide a stable lashing, but sometimes requires a lashing operation with a high degree of difficulty.

The present invention has been made in view of the above problems, and a first object thereof is to provide a lashing hook which does not easily drop off from the fixing member even in a state where it is hooked to the fixing member from the lower side.

It is a second object of the present invention to provide a lashing device including a lashing hook which does not easily drop off from the fixing member even in a state where it is hooked to the fixing member from the lower side.

A third object of the present invention is to provide a lashing method of a lashing target using the lashing hook described above.

SUMMARY

In order to achieve the above object, the first aspect of an embodiment is a lashing hook including a hook portion to be hooked to a fixing member of a lashing target and a body portion integrated with the hook portion, wherein
the body portion includes a connecting portion for connecting a belt equivalent for transmitting tension, and
the hook portion comprises:
a base portion connected to the body portion; and
a curved portion existing between the base portion and its tip portion, wherein
the curved portion has an outer shape having an opening between the base portion and the tip portion and having a space for accommodating a fixing member inside the opening, and
when the direction in which the body portion and the vicinity of the base portion have a thickness is the Z direction, the curved portion has a bend in the Z direction so as not to overlap the Z directional position of the tip portion and the Z directional position of the base portion.

The second aspect of the embodiment is the lashing hook according to the first aspect, wherein said connecting portion and said hook portion have a positional relationship in which the extension of the center line of the belt equivalent connected to the connecting portion intersects with the curved portion.

The third aspect of the embodiment is the lashing hook according to the first or second aspect, wherein the bend is a twist in the Z direction of the curved portion that displaces the position of the tip in the Z direction to a position that does not overlap the position of the base in the Z direction.

The fourth aspect of the embodiment is the lashing hook according to the second aspect, wherein the end surface of the curved portion on the side of the space is parallel to the Z-axis direction in the vicinity of the base portion, and is inclined in the direction of the twist with respect to the Z-axis direction in the vicinity of the center portion of the curved portion.

The fifth aspect of the embodiment is the lashing hook according to the third or fourth aspect, wherein the angle of twist of the tip portion with respect to the base portion is 55 degrees or less.

The sixth aspect of the embodiment is the lashing hook according to the fifth invention, the angle of twist of the tip portion with respect to the base portion is 45 degrees or less.

The seventh aspect of the present invention is the lashing hook according to the sixth aspect, wherein the angle of twist of the tip portion with respect to the base portion is 30 degrees or less.

Furthermore, the eighth aspect of the embodiment is a lashing device having a lashing hook according to any one of the first through seventh aspect, further comprising:

a belt equivalent connected to a body portion of the lashing hook on one side;

a fixing hook connected to the other side of the belt equivalent; and a tension generating mechanism for applying tension to the belt equivalent between the lashing hook and the fixing hook.

The ninth aspect of the embodiment is a lashing method of a lashing target using the lashing device according to the eighth aspect, comprising steps for:

hooking the lashing hook from the lower side to the fixing member of the lashing object;

hooking the fixing hook to an immovable member installed in the region for fixing the position of the lashing target; and operating the tension generating mechanism so that tension is applied to the belt equivalent after the hooking of the lashing hook and the hooking of the fixing hook are completed.

Advantages of the Invention

According to the first aspect of the embodiment, the lashing hook can be hooked to the fixing member at the hook portion. The lashing hook can apply the tension generated by the belt equivalent to the fixing member of a lashing target. Therefore, by hooking the lashing hook to a plurality of places of the lashing target, positional deviation of the lashing target can be effectively prevented.

The hook portion in the present embodiment needs to have an opening sized to allow the fixing member to pass therethrough. When the Z-directional positions of the base portion and the tip portion are aligned, the opening of the hook portion needs to be provided with a distance larger than the width of the fixing member in a direction perpendicular to the Z-direction (hereinafter, simply referred to as "vertical direction"). Here, when the position of the tip portion in the Z direction is shifted from the position of the base portion in the Z direction, the distance of the opening increases by the amount of the shift in the Z direction. In this case, if the increased distance is larger than the width of the fixing member, the fixing member can pass through the opening. Therefore, according to the present embodiment, the distance in the vertical direction of the opening can be reduced as compared with the case where the Z-directional positions of the base portion and the tip portion are aligned. As a result, according to the present invention, the hook is harder to drop off from the fixing member as compared with the hook in which the Z-directional positions of the base portion and the tip portion are aligned.

In a state in which the fixing member passes through the opening and is accommodated in the curved portion of the hook portion, the tip portion of the hook portion locates closer to the opening side than the fixing member does. Under the state discussed above, if the tip portion of the hook portion moves toward the curved portion side until passing over the fixing member, the lashing hook drops off from the fixing member. When no bend is formed in the hook portion, the hook portion contacts the fixing member only on the inner end surface. In this case, in the process of the state change, only the sliding friction between the end surface and the fixing member generates a resistance. In the present embodiment, a bend is provided at the tip portion of the hook portion. For this reason, in the process of the state change described above, the side surface in the vicinity of the tip portion comes into contact with the fixing member, and further resistance that prevents the movement of the tip portion is apt to occur. In this respect as well, the lashing hook according to the present embodiment is harder to drop off from the fixing member as compared with the lashing hook having no bend at the tip portion.

As described above, the lashing hook according to the present embodiment exhibits a characteristic that it is harder to drop off from the fixing member as compared with the lashing hook in which no bend is provided at the tip portion of the hook portion. Therefore, according to the present embodiment, it is possible to provide a lashing hook which does not easily drop off from the fixing member even in a state where the lashing hook is hooked to the fixing member from the lower side.

According to the second aspect of the present embodiment, the tension generated by the belt equivalent acts along the centerline of the belt equivalent. In the present embodiment, since the center line intersects with the curved portion, the tension generated by the belt equivalent acts as a force to press the curved portion of the hook portion against the fixing member to be latched. Therefore, according to the present invention, it is possible to create a state in which it is difficult for the lashing hook to drop off from the fixing member by generating tension in the belt equivalent.

According to the third aspect of the present embodiment, it is possible to realize a desired bend by the twist that displaces the vicinity of the tip portion of the curved portion in the Z direction.

According to the fourth aspect of the present embodiment, since the end surface is inclined in the vicinity of the center portion of the curved portion, the contact between the fixing member and the hook portion is not a surface contact but a point contact or a line contact. Point or line contact results in greater frictional resistance than surface contact. The greater the frictional resistance generated between the fixing member and the hook portion, the more difficult it is for the lashing hook to drop off from the fixing member. Therefore, according to the present aspect, it is possible to further improve the resistance to the lashing hook from dropping off.

According to the fifth aspect of the present embodiment, the tip portion of the curved portion is given a twist angle of 55 degrees or less within a range in which its position in the Z direction does not overlap with that of the base portion. In such a range, superior resistance with regard to dropping off from the fixing member can be obtained as compared with the lashing hook in which the Z-directional positions of the base portion and the tip portion are aligned.

According to the sixth aspect of the present embodiment, the tip portion of the curved portion is given a twist angle of 45 degrees or less within a range in which its position in the Z direction does not overlap with that of the base portion. According to the present aspect, it is possible to obtain better resistance with respect to dropping off from the fixing member as compared with the fifth aspect.

According to the seventh aspect of the present embodiment, the tip portion of the curved portion is given a twist angle of 30 degrees or less within a range in which its position in the Z direction does not overlap with that of the base portion. According to the present aspect, it is possible to obtain better resistance to the dropping off from the fixing member as compared with the sixth aspect.

According to the eighth aspect, it is possible to provide a lashing device comprising a lashing hook according to any one of the first through seventh aspects. According to the lashing device of the present aspect, a tension can be generated between the lashing hook and the fixing hook by the function of the tension generating mechanism. By applying this tension to the lashing target, positional deviation of the lashing target can be prevented. According to the present aspect, it is possible to make the operation of hooking the lashing hook from the lower side be allowable. Therefore, according to the present aspect, the lashing work can be completed with an easy task.

According to the ninth aspect of the present embodiment, it is possible to apply a tension between the immovable member and the lashing target by using the lashing device according to the eighth aspect of the present embodiment. Further, according to the present aspect, the lashing hook is hooked to the fixing member from the lower side. The work of hooking from the lower side may be easier than the work of hooking from the upper side. Therefore, according to the present aspect, the lashing work can be facilitated as compared with the case where only the hooking from the upper side is allowed.

BRIEF DESCRIPTION OF THE DRAWINGS

FIG. 6 shows results of a transfer test in a case where the lashing hook of the first embodiment of the present invention is used in a way of under hooking;

FIG. 7 shows results of a transfer test in a case where the lashing hook of the first embodiment of the present invention is used in a way of side hooking;

FIG. 8 shows results of an elevation angle test in a case where the lashing hook of the first embodiment of the present invention is used in a way of under hooking; and FIG. 9 shows results of a transfer test in a case where the lashing hooks of the second and third embodiments of the present invention are used in a way of under hooking.

DETAILED DESCRIPTION OF THE INVENTION

First Embodiment

Configuration of First Embodiment

Figure 1:
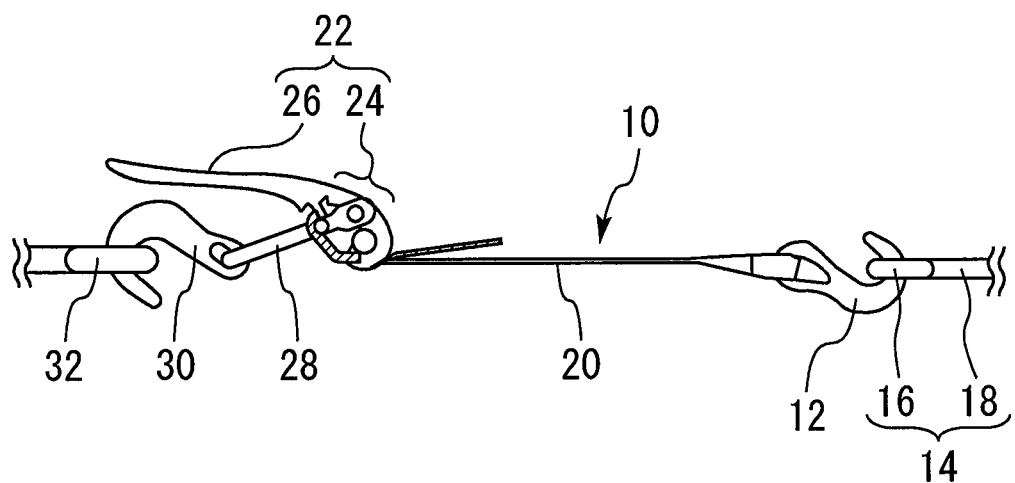
FIG. 1 is a view showing a state of the lashing device according to the first embodiment of the present invention before generating tension.

FIG. 1 shows a configuration of a lashing device 10 according to a first embodiment of the present invention. The lashing device 10 includes a lashing hook 12. The lashing hook 12 is fastened to the fixing member. In the present embodiment, the eye-bolt 14 is used as the fixing member.

The eye-bolt 14 includes a loop portion 16 and a bolt portion 18. The loop portion 16 is an annular member having a space in the center. The bolt portion 18 is fastened to a lashing target (not shown). The lashing target may be various objects such as an automobile, a container, and the like which need to prevent positional deviation in the process of conveyance and the like.

In FIG. 1, the eye-bolt 14 is disposed so that the loop portion 16 is placed horizontally. The lashing hook 12 is hooked from below to the loop portion 16 which is arranged horizontally. Hereinafter, such a hooking method is referred to as an "under hooking". On the other hand, a technique of hooking the lashing hook 12 from the upper side to the loop portion 16 arranged horizontally is referred to as an "over hooking". Further, a technique of hooking the lashing hook 12 from lateral side to the loop portion 16 arranged perpendicular is referred to as "side hooking".

The lashing hook 12 is connected to one end of a belt 20. The belt 20 can be replaced by a rope or chain. The other end of the belt 20 is connected to a tension generating mechanism 22. The tension generating mechanism 22 includes a mechanism 24 for winding and holding the belt 20, and an operating lever 26. FIG. 1 shows a state in which the operating lever 26 is in a tension release position.

The tension generating mechanism 22 is connected to an arm 28. Further, the arm 28 is connected to a fixing hook 30. The fixing hook 30 is fastened to the immovable member. In the present embodiment, an eye-bolt 32 is used as the immovable member. The eye-bolt 32 is an immovable member fixed on an area such as a deck of a ship in which a lashing target is to be fixed. In FIG. 1, the eye-bolt 32 is disposed so that the loop portion is horizontal. The fixing hook 30 is over hooked on the eye-bolt 32.

When the lashing device of the present embodiment is used, the lashing hook 12 is under hooked on the eye-bolt 14 of the lashing target firstly, as shown in FIG. 1. Then, the fixing hook 30 is hooked on the eye-bolt 32. Thereafter, the winding portion of the belt 20 is adjusted to such an extent that the loosening of the belt 20 is eliminated. Finally, the operating lever 26 is moved from the tension releasing position of the fixing hook 30 side to the tension generating position of the lashing hook 12 side.

Figure 2:
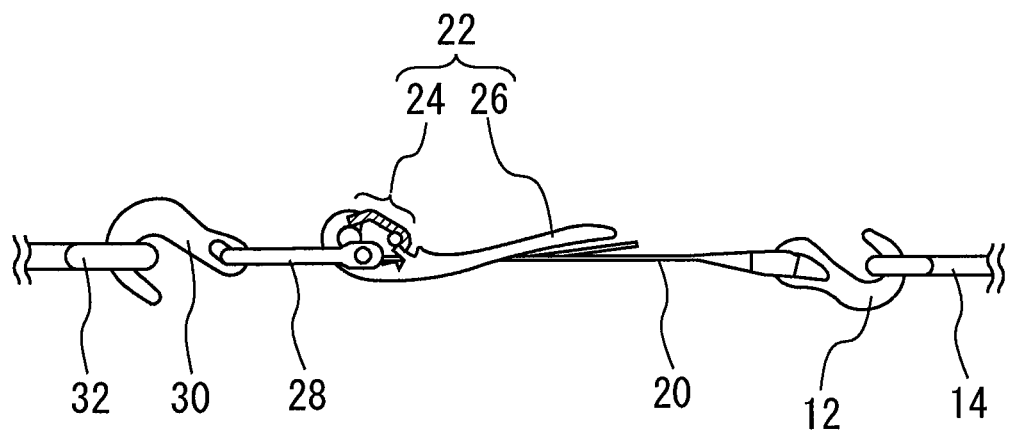
FIG. 2 is a view showing a state of the lashing device according to the first embodiment of the present invention while generating tension.

FIG. 2 shows a state which occurs after the operating lever 26 is moved to the tension generating position. The tension generating mechanism 22 pulls the belt 20 into the mechanism 24 by means of the principle of leverage during the process in which the operating lever 26 is moved from the fixing hook 30 side to the lashing hook 12 side. As a result, in the state shown in FIG. 2, tension is generated between the lashing hook 12 and the fixing hook 30. For example, when an automobile boarded on a ship is the lashing target, the positional deviation of the lashing target can be prevented by applying the tension to the four corners of the automobile.

[Features of the Lashing Hook]

Figure 3:
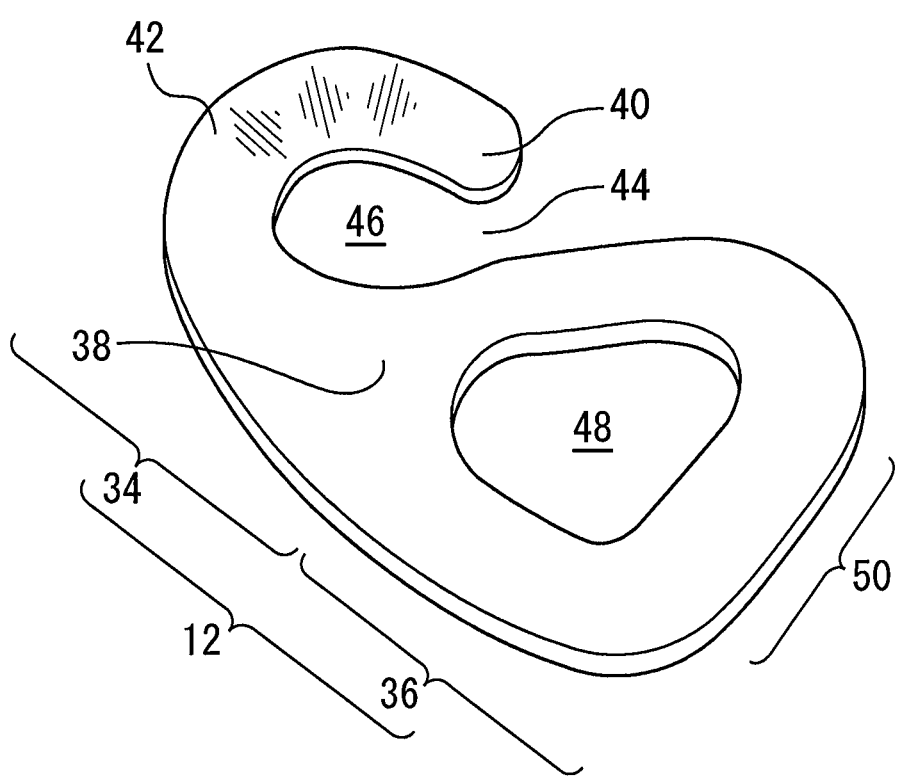
FIG. 3 is a perspective view of a lashing hook included in the lashing device according to the first embodiment of the present invention.
Figure 4:
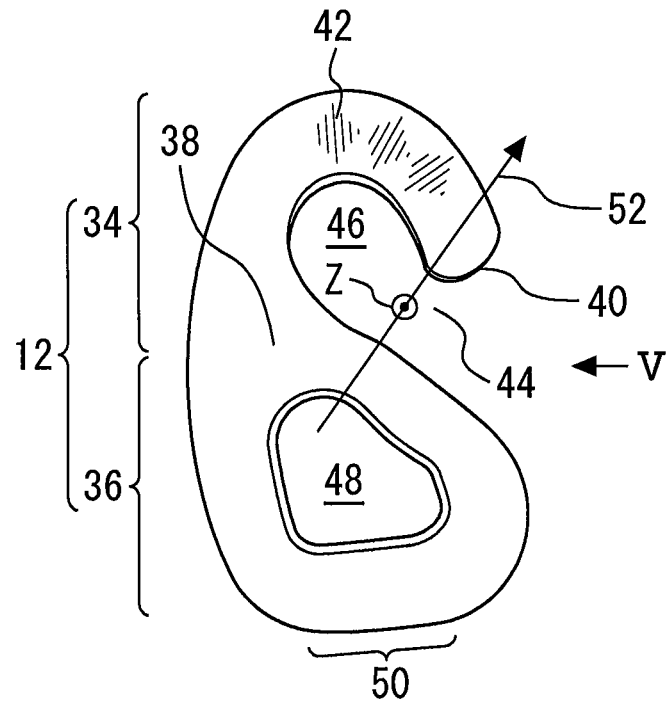
FIG. 4 is a plan view of the lashing hook shown in FIG. 3.
Figure 5:
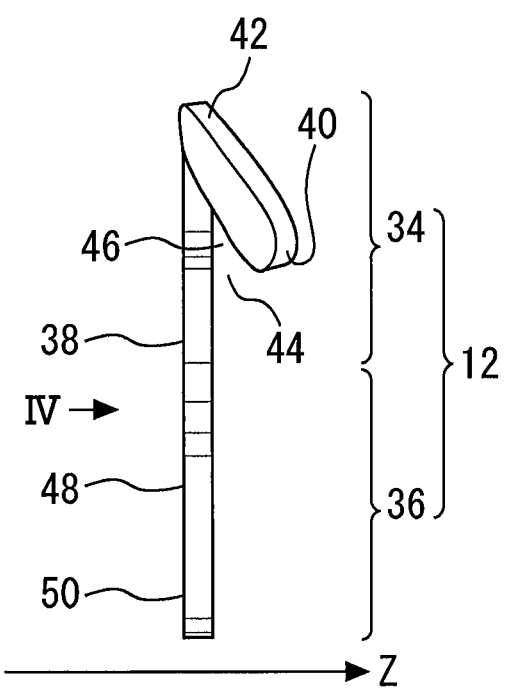
FIG. 5 is a side view of the lashing hook shown in FIG. 4.

FIG. 3 is a perspective view of the lashing hook 12 used in the present embodiment. FIG. 4 is a view showing the lashing hook 12 in plan view. FIG. 5 is a side view of the lashing hook which is taken when viewed from the direction shown by the arrow V in FIG. 4. It should be noted that the arrow IV shown in FIG. 5 indicates the direction of the plan view shown in FIG. 4.

As shown in FIGS. 3 to 5, the lashing hook 12 of the present embodiment includes a hook portion 34 and a body portion 36. The hook portion 34 is connected to the body portion 36 at a base portion 38. The hook portion 34 has a curved portion 42 between the base portion 38 and a tip portion 40. There is an opening 44 between the base portion 38 and the tip portion 40. The curved portion 42 has an outer shape of C-shaped or U-shaped, and a circular space 46 is formed inside the opening 44.

A through hole 48 is provided in the body portion 36 of the lashing hook 12. The body portion 36 has a connecting portion 50 for winding the belt 20 on the opposite side of the curved portion 42 with the through-hole 48 interposed therebetween. As shown in FIG. 1, the belt 20 is connected to the lashing hook 12 by being wounded around the connecting portion 50.

The connecting portion 50 is provided so as to face the central portion of the curved portion 42. Thus, when the belt 20 is connected to the connecting portion 50, the extension of the centerline of the belt 20 intersects the approximate center of the curved portion 42. Therefore, according to the lashing hook 12 of the present embodiment, the tension generated by the belt 20 acts substantially at the center of the curved portion 42.

In this embodiment, the curved portion 42 of the lashing hook 12 has a "bend". This "bend" is provided so that the Z-directional position of the tip portion 40 does not overlap the Z-directional position of the base portion 38 when the thickness direction around the base portion 38 of the hook portion 34 is defined as the Z-direction (see FIG. 5). More specifically, in the present embodiment, the bend of the curved portion 42 is formed by causing a twist in the vicinity of the central portion of the curved portion 42 such that the tip portion 40 is inclined by 30 degrees with respect to the base portion 38 (see, FIGS. 3 and 4 further).

In order to fix the lashing hook 12 by hooking to the eye-bolt 14, the shaft element forming the loop portion 16 of the eye-bolt 14 must be able to pass through the opening 44. For this reason, it is necessary to provide the opening 44 with a distance larger than the width of the shaft element of the eye-bolt 14, i.e., the diameter of the shaft element if the shaft element is cylindrical. The greater this distance, the easier the lashing hook 12 will drop off from the eye-bolt 14.

Assuming that the tip portion 40 of the hook portion 34 overlaps the base portion 38 in the Z direction, the opening 44 must have a distance that exceeds the width of the shaft element of the eye-bolt 14 in the direction 52 perpendicular to the Z direction. Hereinafter, the hook having such a configuration discussed above is referred to as a "comparison hook".

In the present embodiment, the Z-directional position of the tip portion 40 deviates from the Z-directional position of the base portion 38 due to the influence of the "bend" of the curved portion 42. Thus, the distance of the opening 44 is increased by the amount due to the deviation. Therefore, in the configuration of the present embodiment, even if the distance of the opening 44 in the vertical direction 52 is equal to the width of the shaft element of the eye-bolt 14, the shaft element can pass through the opening 44.

As described above, according to the configuration of the present embodiment, the distance in the vertical direction 52 of the opening 44 can be narrowed as compared with the configuration in which the tip portion 40 of the hook portion 34 and the base portion 38 overlap in the Z direction. Therefore, the lashing hook 12 of the present embodiment exhibits a characteristic that it is harder to drop off from the eye-bolt 14 as compared with the comparison hook.

In the present embodiment, the "bend" of the curved portion 42 is formed by twisting the curved portion 42 in the vicinity of the center thereof. The influence of this twist also appears on the end surface of the curved portion 42 on the space 46 side, that is, the end surface where the curved portion 42 contacts the eye-bolt 14. More specifically, in the lashing hook 12 of the present embodiment, the end surface of the curved portion 42 is substantially parallel to the Z direction around the base portion 38, but from the vicinity of the center of the curved portion 42 to the tip portion 40, the end surface forms a surface inclined with respect to the Z axis due to the influence of the twist.

In the comparison hook, the end surface of the curved portion 42 is parallel to the Z-axis in all regions. In this case, the curved portion 42 comes into contact with the eye-bolt 14 on whole width of the end surface. On the other hand, in the lashing hook 12 of the present embodiment, the curved portion 42 contacts the eye-bolt 14 only at the end point of the inclined end surface from the vicinity of the central portion to the tip portion 40. The smaller the contact area, the greater the frictional force exerted between the curved portion 42 and the eye-bolt 14. Therefore, according to the configuration of the present embodiment, it is possible to secure a large frictional force as compared with the case of the comparative example. Also in this respect, the lashing hook of the present embodiment exhibits a characteristic that it is harder to drop off from the eye-bolt 14 as compared with the comparison hook.

[Results of Drop-Off Test]

FIG. 6 shows results of a first drop-off test performed on the comparison hook and the lashing hook 12 of the present embodiment. The test conditions are as follows:

1. The lashing target: An automobile having an eye-bolt 14 at a height of 46.5 cm above the ground;
2. How to hook: Under hooking;
3. Initial conditions: Maintain the belt 20 at a position 30 cm ahead of the eye-bolt 14 and 75 cm above the ground with a tension of 180 g; and.
4. Test operation: The holding position of the belt 20 is moved horizontally toward the eye-bolt 14, and occurrence or absence of a dropping off as well as the moving distance until the occurrence of the dropping off are measured.

As shown in FIG. 6, the hook of the comparative example dropped off from the eye-bolt 14 in all the thirty times of tests. The moving distance to dropping off is at most 24 mm.

On the other hand, the lashing hook 12 of the present embodiment does not drop off even if it moved the entire distance of 300 mm in all the thirty times of tests. As described above, the lashing hook 12 of the present embodiment exhibits extremely superior stability compared to the hook of the comparative example when used in the way of under hooking.

FIG. 7 shows the results of the second drop-off test. The method of this test is the same as that of the first drop-off test except that the posture of the eye-bolt 14 is changed so that the loop portion 16 takes a vertical position, and the hook of the comparative example and the lashing hook 12 of the present embodiment are hooked by the way of side hooking.

As shown in FIG. 7, the hook of the comparative example drops off from the eye-bolt 14 in all thirty times of tests even it is hooked by the way of side hooking. The moving distance to drop-off is at most 33 mm. On the other hand, the lashing hook 12 of the present embodiment does not drop off even if it moves the entire distance of 300 mm in all thirty times of tests. As described above, the lashing hook 12 of the present embodiment exhibits extremely superior stability compared to the hook of the comparative example even when it is used in the way of side hooking.

FIG. 8 shows the results of the third drop-off test. The test conditions are as follows, in which conditions 1 and 2 are the same as those in the first drop-off test among the test conditions described below:

1. The lashing target: An automobile having eye-bolts 14 at a height of 46.5 cm above the ground;
2. How to hook: Under hooking;
3. Initial conditions: holding the belt 20 under a tension of 180 g at a position 30 cm in front of the eye-bolt 14 and a height at which the belt 20 takes a horizontal posture (15 cm height); and
4. Test operation: While maintaining the tension on the belt 20, moving the holding position of the belt 20 upward around the lashing hook 12, and measure the occurrence or absence of a dropping off and the elevation angle of the belt 20 at the time of occurrence of the dropping off.

As shown in FIG. 8, the hook of the comparative example dropped off from the eye-bolt 14 at an elevation angle of at least 21 degrees and at most 28 degrees in thirty times of tests. On the other hand, in the lashing hook 12 of the present embodiment, no fall occurred until the elevation angle reached 54 degrees in thirty times of tests. As described above, the lashing hook 12 of the present embodiment has extremely superior performance compared to the hook of the comparative example in terms of the elevation angle that can be allowed for the belt 20.

Various vibrations are transmitted to the lashing target which is fixed on the deck of a ship or the like during its transportation. As a result, temporary expansion and contraction as well as a change in elevation angle occur in the belt 20 that is tensioning the lashing target. When the hook is used in the way of over hooking, the weight of the hook acts in a direction to maintain the hooking with the eye-bolt 14. Therefore, the hook of the comparative example does not drop off from the eye-bolt 14 when it is used in the way of over hooking. However, the hook of the comparative example drops from the eye-bolt 14 when the reduction amount or the elevation angle of the belt 20 reaches the dropping condition shown in FIGS. 6 to 8, in the case where it is used by the way of under hooking or side hooking. For this reason, it is not appropriate to use the hook of the comparative example in the way of under hooking or side hooking.

On the other hand, the lashing hook 12 of the present embodiment does not drop off from the eye-bolt 14 within the range of reduction or change in elevation angle occurring in the belt 20 during a transportation process. For this reason, the lashing hook 12 can be used in the way of under hooking as well as side hooking without being limited to the way of over hooking. The availability of the under hooking and the side hooking as a method of hooking increases the freedom of the hooking operation and greatly facilitates the operation. Therefore, according to the lashing hook 12 of the present embodiment and the lashing device 10 of the present embodiment, the labor involved in the lashing operation can be remarkably reduced as compared with the case where the hook of the comparative example is used.

Modification of First Embodiment

In the first embodiment described above, an example in which the fixing member and the immovable member are the eye-bolts 14 and 32, respectively, is described, but the present invention is not limited to this. The fixing member and the immovable member are not limited to eye-bolts and may be other members as long as the hook can be latched.

In the first embodiment described above, the "bend" of the curved portion 42 is formed by twisting, but the present invention is not limited to this. The "bend" may be formed by a step shaped configuration.

In the first embodiment described above, the tension generating mechanism 22 is limited to the specific structure, but the mechanism is not limited to this. As the tension generating mechanism 22, a known cam buckle, an over-center buckle, a ratchet buckle, a square buckle, or the like can be used, for example.

Second and Third Embodiments

Next, second and third embodiments of the present invention will be described with reference to FIG. 9. The second embodiment of the present invention is the same as the first embodiment except that the inclination angle of the tip portion 40 with respect to the base portion 38 is changed from 30 degrees to 45 degrees. The third embodiment of the present invention is the same as the first embodiment except that the inclination angle of the tip portion 40 with respect to the base portion 38 is changed from 30 degrees to 55 degrees.

[Results of Drop-Off Test]

FIG. 9 shows the results of the first drop-off test performed on the lashing hook 12 of the second embodiment and the lashing hook 12 of the third embodiment. The test conditions are the same as those of the first drop-off test performed in the first embodiment.

As shown in FIG. 9, the lashing hook 12 of the second embodiment, that is, the lashing hook 12 having an inclination angle of 45 degrees, does not drop off even if it moves the entire distance of 300 mm in sixteen times among twenty times of tests. As described above, the lashing hook 12 having an inclination angle of 45 degrees is inferior to the lashing hook 12 of the first embodiment, but has much higher drop-off resistance than the hook of the comparative example. Therefore, the lashing hook 12 having an inclination angle of 45 degrees at the tip portion 40 can also sufficiently reduce the labor of the lashing operation as compared with the hook of the comparative example.

In addition, as shown in FIG. 9, the lashing hook 12 of the third embodiment, that is, the lashing hook 12 having an inclination angle of 55 degrees, does not drop off even if it moves the entire distance of 300 mm in nine times among twenty times of tests. As described above, the lashing hook 12 having an inclination angle of 55 degrees also exhibits higher drop-off resistance than the hook of the comparative example. Therefore, the lashing hook 12 having the inclination angle of 55 degrees at the tip portion 40 can also reduce the labor of the lashing operation as compared with the hook of the comparative example.

Incidentally, in the first through the third embodiments described above, the belt 20 corresponds to the "belt equivalent" in the first aspect of the embodiment.

EXPLANATION OF REFERENCE NUMBERS

10 Lashing device
12 Lashing hook
14, 32 Eye-bolt
16 Loop portion
18 Bolt portion
20 Belt
22 Tension generating mechanism
30 Fixing hook
34 Hook portion
36 Body portion
38 Base portion
40 Tip portion
42 Curved portion
44 Opening
46 Space
50 Connecting portion

The invention claimed is:

1. A lashing hook comprising,
a hook portion hooked to a fixing member of a lashing target; and
a body portion integrated with said hook portion, wherein
said body portion comprises a connecting portion for connecting a belt equivalent for transmitting tension, and
said hook portion comprises:
a base portion connected to said body portion; and
a curved portion existing between said base portion and a tip portion, wherein
said curved portion has an outer shape having an opening between said base portion and said tip portion and having a space for accommodating said fixing member inside said opening, and wherein
when a direction in which said body portion and the vicinity of said base portion have a thickness is a Z direction, said curved portion has a bend in a Z direction so as not to overlap the Z directional position of said tip portion and the Z directional position of said base portion.

2. The lashing hook according to claim 1, wherein said connecting portion and said hook portion have a positional relationship in which an extension of a center line of said belt equivalent connected to the connecting portion intersects with the curved portion.

3. The lashing hook according to claim 1, wherein said bend is a twist in the Z direction formed in said curved portion, which displaces the Z directional position of said tip portion to a position which does not overlap the Z directional position of said base portion.

4. The lashing hook according to claim 3, wherein the end surface of said curved portion on said space side is parallel to the Z direction in the vicinity of the base portion, while it is inclined in the direction of the twist with respect to the Z direction in the vicinity of the center portion of said curved portion.

5. The lashing hook according to claim 3, wherein the angle of twist of said tip portion with respect to said base portion is 55 degrees or less.

6. The lashing hook of claim 5, wherein the angle of twist of said tip portion with respect to said base portion is 45 degrees or less.

7. The Lashing hook according to claim 6, wherein the angle of twist of said tip portion with respect to said base portion is 30 degrees or less.

8. A lashing device comprising:
a lashing hook including a hook portion hooked to a fixing member of a lashing target; and
a body portion integrated with said hook portion, wherein
said body portion comprises a connecting portion for connecting a belt equivalent for transmitting tension, and
said hook portion comprises:
a base portion connected to said body portion; and
a curved portion existing between said base portion and a tip portion, wherein
said curved portion has an outer shape having an opening between said base portion and said tip portion and having a space for accommodating said fixing member inside said opening, and wherein
when a direction in which said body portion and the vicinity of said base portion have a thickness is a Z direction, said curved portion has a bend in a Z direction so as not to overlap the Z directional position of said tip portion and the Z direction al position of said base portion, further comprising:
a belt equivalent connected to the body portion of said lashing hook on one side;
a fixing hook connected to the other side of said belt equivalent; and
a tension generating device for applying tension to said belt equivalent between said lashing hook and said fixing hook.

9. A method for lashing a lashing target using a lashing device comprising a lashing hook including a hook portion hooked to a fixing member of a lashing target and a body portion integrated with said hook portion, wherein
said body portion comprises a connection portion for connecting a belt equivalent for transmitting tension, and
said hook portion comprises:
a base portion connected to said body portion; and
a curved portion existing between said base portion and a tip portion, wherein
said curved portion has an outer shape having an opening between said base portion and said tip portion and having a space for accommodating said fixing member inside said opening, and wherein
when a direction in which said body portion and the vicinity of said base portion have a thickness is a Z direction, said curved portion has a bend in a Z direction so as not to overlap the z directional position of said tip portion and the Z directional position of said base portion, further comprising:
a belt equivalent connected to the body portion of said lashing hook on one side;
a fixing hook connected to the other side of said belt equivalent; and a tension generating device for applying tension to said belt equivalent between said lashing hook and said fixing hook, the method comprising:

hooking said lashing hook to a fixing member provided on said lashing target from below;

hooking said fixing hook to an immovable member installed in a region where the position of the lashing target is fixed at; and operating the tension generating device so that tension is applied to the belt equivalent after the hooking of the lashing hook and the hooking of the fixing hook are completed.

\* \* \* \* \*